United States Patent [19]

Lake

[11] Patent Number: 4,545,456
[45] Date of Patent: Oct. 8, 1985

[54] FOUR-WHEEL DRIVE AXLESHAFT CLUTCH MECHANISM

[75] Inventor: William R. Lake, Lathrup Village, Mich.

[73] Assignee: Ford Motor Company, Dearborn, Mich.

[21] Appl. No.: 531,306

[22] Filed: Sep. 12, 1983

[51] Int. Cl.⁴ ...................... B60K 17/34; B60K 23/08
[52] U.S. Cl. .................................. 180/233; 180/247; 192/93 A
[58] Field of Search ............... 180/247, 248, 249, 250, 180/233; 74/710.5, 713; 192/93 A, 67 R

[56] References Cited

U.S. PATENT DOCUMENTS

| | | | |
|---|---|---|---|
| 3,941,199 | 3/1976 | Williams | 180/248 |
| 4,266,646 | 5/1981 | Telford | 192/67 R |
| 4,381,828 | 5/1983 | Lunn et al. | 180/247 |
| 4,382,495 | 5/1983 | Fleitas | 180/247 X |

OTHER PUBLICATIONS

SAE Technical Paper No. 821, 261, Ranger/Bronco II Automatic Hub Locks, Nov. 1982.

*Primary Examiner*—John A. Pekar
*Attorney, Agent, or Firm*—Frank G. McKenzie; Donald J. Harrington

[57] ABSTRACT

A part-time four-wheel drive system for a motor vehicle includes a first set of wheels on a rear axleshaft driven from a transfer case through an axle differential, a front driveshaft driven from the transfer case, which transmits power to front axleshafts through a front axle differential. Integrally formed with the front differential mechanism is an automatic center disconnect which selectively connects and disconnects the front driveshaft from one of the front axleshafts. A cam mechanism within the differential mechanism moves a cam follower outward thereby producing a splined connection between the differential output and the selectively engaged front axleshaft so that the second wheel set is driven from the transfer case. When two-wheel drive operation is selected and the vehicle is driven in the opposite direction that which produced engagement, the differential casing rotates circular cams in the opposite direction causing the cam follower to move inboard, thereby disengaging the spline connection that produced four-wheel drive. The other front axleshaft is continuously connected to the differential mechanism and causes certain of its components to rotate in the opposite direction after the transfer case is disconnected from the front driveshaft.

7 Claims, 3 Drawing Figures

FOUR-WHEEL DRIVE AXLESHAFT CLUTCH MECHANISM

BACKGROUND OF THE INVENTION

1. Field of the Invention

This invention pertains to the field of power transmissions for vehicles, and more particularly to such systems that transmit power at the option of the vehicle operator, either to a first set of drive wheels or to first and second sets of drive wheels.

2. Description of the Prior Art

In current systems that provide part-time, four-wheel drive in a motor vehicle, the operator has to exit the passenger compartment in order to set the front wheel hublocks for four-wheel drive operation, then re-enter the vehicle and move the shift selector that controls the transfer case operation to the four-wheel drive position. Later manufacturers introduced full-time four-wheel drive systems that cause the front drive components to rotate at all times and thereby avoid any need for selectively operated hublocks. Full-time four-wheel drive systems, however, substantially reduce the fuel economy of the vehicle as compared to two-wheel drive operation because a large amount of inertial mass is continuously rotated. Recently, automatic hublocks, one associated with each of the wheels (usually the front wheels) that are driven on a part-time basis, were introduced to eliminate the need to leave the vehicle in order to engage the hublocks. In some of the part-time overdrive four-wheel drive systems, the vehicle must be stopped and shifted to four-wheel drive, then automatic hublocks are engaged when the vehicle is driven ahead. Hublock disengagement is accomplished the first time the vehicle is moved in the direction that is opposite to the direction that produced four-wheel drive operation; provided the transfer case is previously set for operation in two-wheel drive.

More recently, drive systems have been manufactured that permit shifting from two-wheel drive to four-wheel drive while the vehicle is moving. In such systems when two-wheel drive is selected, a sliding synchronizer collar within the front axle assembly disconnects one of the front axleshafts from the front differential allowing the ring gear of the differential, the front driveshaft and the transfer case chain to remain stationary while operating in two-wheel drive. In order to engage four-wheel drive, the operator moves the shift lever to the four-wheel drive, high speed ratio position. This action driveably connects the front driveshaft and allows it to accelerate to a speed that corresponds to the vehicle speed. Then a vacuum valve in the transfer case activates a vacuum diaphragm mounted in the engine compartment. The diaphragm pulls a cable, which moves a sliding collar in the front axle assembly to connect the differential to the previously disconnected front axleshaft. The shift from two-wheel drive to four-wheel drive when made in cold weather and under other adverse conditions when transmission oil viscosity is a factor, must be made only at slow speed in order to keep the effort required to move the shift lever at a reasonable magnitude. In four-wheel drive operation, shifts are made between the high speed ratio and low speed ratio provided the vehicle is stopped and the transmission is first shifted to neutral as in the conventional practice.

SUMMARY OF THE INVENTION

One object of the present invention is to provide a system for transmitting power to the drive wheels of a vehicle when either one set or two sets of wheels are driven concurrently. A second object is to produce a means for disengaging the driveable connection between the transfer case output and the axleshaft that transmits power to the drive wheels without the need for an individual automatic hublock associated with each of the drive wheels.

The transfer case, according to the drive system of this invention, has an output shaft that transmits power to the rear wheels continuously during operation and a chain drive mechanism for transmitting power from the transmission output to a front driveshaft when four-wheel drive is selected. The front driveshaft transmits power to the front axles through an axle differential mechanism that includes a ring gear driven by the front axleshaft mounted on the differential casing, which rotates about the axis of the axleshafts and carries bevel pinions on a stub shaft fixed to the casing. The bevel pinions are in continuous meshing engagement with side bevel gears, one bevel gear being driveably connected to one axleshaft, the other bevel gear being connected to a differential output shaft. Located within the differential housing is a clutch mechanism for driveably connecting the other front axleshaft to the differential output shaft. This connection is made if the associated front driveshaft is driven and the vehicle is moved in a first direction that produces engagement of the clutch mechanism.

The axleshaft clutch engagement mechanism includes an input sleeve shaft keyed to the differential casing having a splined connection to a cam follower that rotates with the differential casing and is adapted to move axially outboard and inboard on the spline formed on the sleeve shaft. The cam follower engages a cam fixed to the differential housing on which cam circular cam surfaces are formed and, in a later state of its operation, a moving cam that has a circular cam surface similar to that of the fixed cam. Drive shoes, resiliently urged into contact with the fixed cam, produce on the moving cam a force that opposes movement of the moving cam with respect to that of the cam follower. A clutch ring cage moves axially with the cam follower outward to produce a splined connection between the output shaft and a selectively engaged front axleshaft, and inward to disconnect the axleshaft from the output shaft. In operation when four-wheel drive is selected, the first front axleshaft is driven in rotation directly through the differential mechanism and the second output shaft is connected to the differential output when the axleshaft clutch is engaged. However, when two-wheel drive is selected, the transfer case discontinues the driveable connection between the transmission output and the differential mechanism. When the vehicle is moved in the direction opposite to that which produced engagement of the axleshaft clutch, the cam follower moves inboard on the cam surfaces causing disengagement of the associated axleshaft from the differential output shaft.

DESCRIPTION OF THE PREFERRED EMBODIMENT

Figure 1:
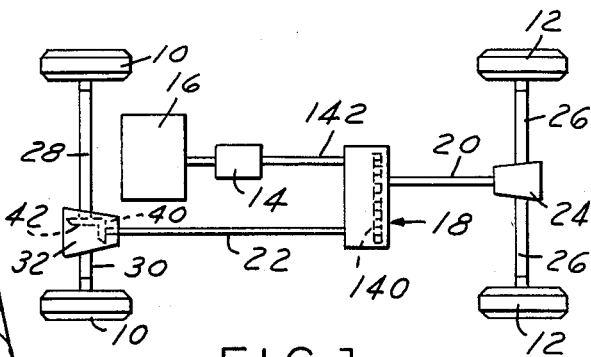
FIG. 1 is a plan view of the drive system according to this invention.

A pair of front wheels 10 and a pair of rear wheels 12 are driven from an engine 16 through an automatic or manual transmission 14 adapted to produce multiple forward and reverse speed ratios, a transfer case 18 continuously driveably connecting the transmission output to a rear output shaft 20 and for selectively connecting the transmission output to a front output shaft 22. Shaft 20 transmits power to a rear differential 24 from which power is transmitted to the rear wheels through rear axleshafts 26. The front wheels 10 are driveably connected, under certain conditions, to right and left axleshafts 28, 30, to which power is transmitted from the front driveshaft and a front differential mechanism 32.

Figure 2A:
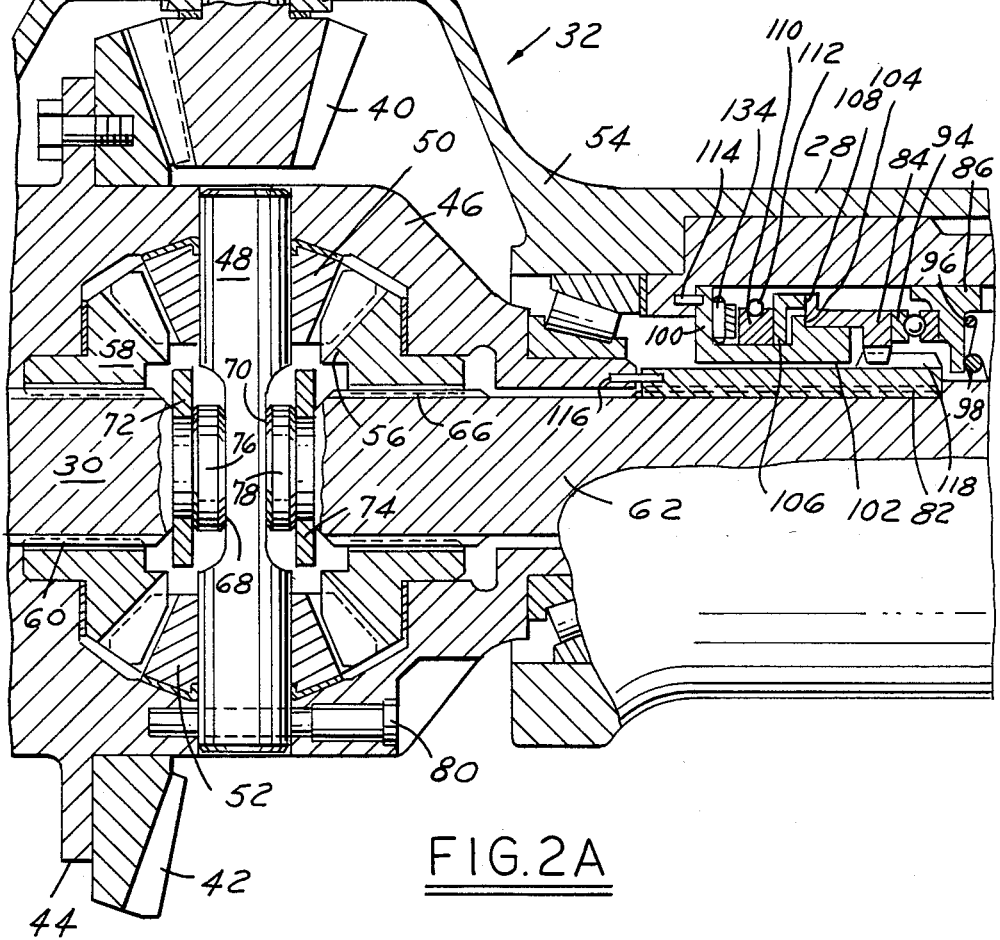
FIG. 2A is a cross section through the front axleshaft differential mechanism showing the arrangement of the differential ring gear pinions, bevel gears, output shaft, and axleshaft.

In FIG. 2A the front differential mechanism 32 is seen to include a bevel pinion 40 fixed to the front driveshaft 22, the pinion being in continuous meshing engagement with a ring gear 42, which is bolted to the flange 44 of the differential casing 46. Fixed to the differential casing on a central plane normal to the axis of the axleshafts is a pinion stub shaft 48, which is fixed to the casing by a stub shaft bolt 80 that engages screw threads in the casing. Journalled on the outer cylindrical surface of the stub shaft are bevel pinions 50 and 52, which are in continuous meshing engagement with side bevel gears 56, 58. The inboard end of front axleshaft 30 is connected by a spline 60 to bevel gear 58 and the input shaft 62 of the automatic clutch mechanism is splined at 66 to bevel gear 56. On assembly, the inboard faces 68, 70 of the shafts 30 and 62 are brought into contact with the cylindrical surface of the stub shaft 48; then, C-washers 72, 74 are inserted within the recesses formed on the shafts between the terminal portions 76, 78 and the full cross section of the shafts. C-washers 72, 74 bear against adjacent surfaces of the shafts and also against the associated side bevel gears, thereby preventing outward movement of the shafts. Inward movement of the shafts is prevented by the bearing contact with stub shaft 48, which is fitted with a close tolerance fit within a bore that extends through the transmission casing.

The transmission housing is partially filled with hydraulic fluid that lubricates the surfaces of the mating gears and pinions and fills the right-hand side of the axle housing, which is sealed by a resilient oil seal 81 fitted between the inner diameter of the differential casing 46 and the outer diameter of the right-hand axleshaft assembly 28. Located within the differential housing is an automatic clutching mechanism which produces a driveable connection between inboard shaft 62 and the right-hand axleshaft 28.

The clutch mechanism includes a drive sleeve shaft 82, a cam follower 84, a clutch ring cage 86, a clutch ring 90 and a thrust bearing assembly 94 located between the outboard surface of the cam follower and the inboard surface of the clutch ring. An engagement spring 96, which is located between the outboard surface of the clutch ring cage and the inboard surfaces of the clutch ring, is compressed as the cage is moved outboard relative to the clutch ring, whereby the clutch ring is biased outward toward axleshaft 28. A heavier disengagement spring 98 has its helically wound coils fitted between the outboard surface of the ring cage and a surface of shaft 62. The compression force developed by spring 98 resiliently biases the ring cage inboard and is reacted by the effect of the cam follower moving on cam surfaces 104, 108 and against thrust bearings 94.

The cam assembly includes a drag ring 100 formed integrally with a primary or fixed cam 102, on which circular cam surfaces 104 are formed. A secondary or moving cam 106 has cam surfaces 108 located radially outward of and generally parallel to the cam surfaces 104 of the fixed cam. Moving cam 106 has several pockets angularly spaced about the axis of the axleshaft, each pocket being fitted with a friction shoe 110, which is resiliently held in contact with the outer cylindrical surface of the drag ring by a garter spring 112. The drag ring is keyed at 114 to the differential housing 54 and is journalled at its inside surface on the outer surface of sleeve shaft 82. The sleeve shaft is keyed at 116 to differential casing 46 so that the shaft and casing rotate as a unit. The spline 118 formed on the outer diameter of shaft 82 is engaged with a spline formed on the inside diameter of the cam follower. In this way, when shaft 82 is rotated by power transmitted through the transfer case, the cam follower rotates.

The outer diameter of input shaft 62 is formed with a spline 120 that is in continuous engagement with a spline formed on the inner surface of the clutch ring 90. Axial movement of clutch ring cage 86 relative to the clutch ring is permitted because the clutch ring has recesses formed on its outer surface through which the arms of the ring cage extend to a flange 122, which is in contact with the outboard surface of the clutch ring under certain conditions of operation. Axleshaft assembly 28 has a spline 124 formed on its outer surface and located in position for selective engagement with the spline formed on the interior surface of the clutch ring. Axleshaft 28 is supported at its inboard end by ball bearings 126 and the outer end of input shaft 62 is supported on needle bearings 128 fitted within a bore on shaft 62.

Fixed cam 102 has six legs angularly spaced about its axis, each leg being formed with a pair of oppositely inclined cam surfaces, which are engaged by the cam follower. Each leg of the fixed cam has a first inclined surface having one direction component parallel to the axis and a second component in the tangential direction. Located at the tangentially interior end of the first surface of the fixed cam is an intersecting second cam surface having axial and tangential direction components equal to those of the first cam surface, its tangential component being larger than its axial component and of the opposite sense of direction from that of the first cam surface.

The inner face of the moving cam 106 is separated from the radially outwardly extending flange of the drag ring 100 by a thrust bearing 134 in order to facilitate relative rotation between them. Moving cam 106 is formed with three angularly spaced pockets, each pocket having an included angle about the axis of approximately sixty degrees; into each pocket is fitted a friction shoe. Located between each pocket on the moving cam is an angularly spaced leg formed with the first and second inclined cam surfaces, each cam surface having axial and tangential direction components. The direction components of the cam surfaces of each leg include axial components having the same magnitude and sense of direction, and tangential components having the same magnitude but opposite sense of direction. Extending outboard on each moving cam leg and located midway between the circumferential extremities of each leg is a boss that forms a stop surface against which the cam follower makes contact as it moves in rotation relative to the moving cam. After the cam follower contacts the boss, the cam follower and moving cam rotate as a unit provided the direction of rotation is such that the cam follower and boss maintain contact. However, when the directional sense of rotation changes, the cam follow disengages the boss and relative rotation between the moving cam and cam follower is possible.

Figure 2B:
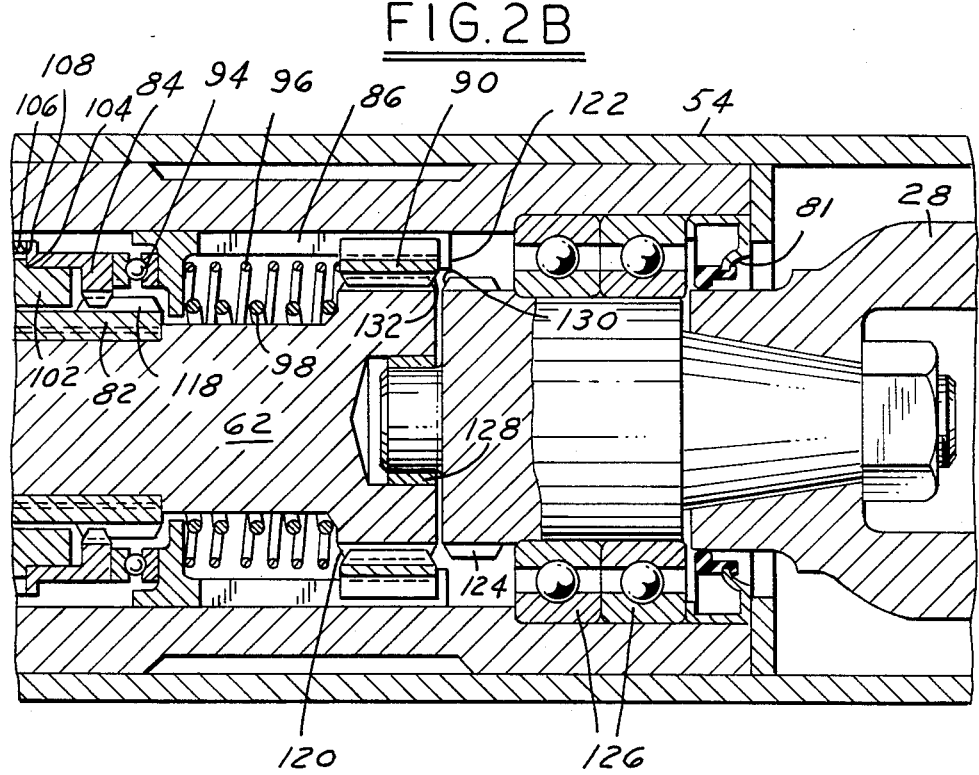
FIG. 2B is a cross section of the front axle showing the automatic clutching mechanism in the disengaged position.

When the front driveshaft 22 is driven by the chainbelt 140, which driveably connects the transmission output 142 and the front driveshaft 22 when the transfer case is dispositioned for four-wheel drive, front axleshaft 30 and the input shaft 62 are driven by the differential mechanism 32. FIG. 2B shows the components of the automatic clutch mechanism 64 in their disengaged position, that is, the position they occupy before the differential mechanism 32 is driven from the transmission output. In this condition, the spline of the cam follower is located at the inboard end of spline 118 on the drive sleeve shaft. Clutch ring 90 is connected to splines 120 of input shaft 62, but it is out of engagement or contact with spline 124 of the axleshaft assembly 28. As differential casing 46 begins to rotate, the cam follower moves outboard on the cam surfaces of the fixed cam, which causes thrust bearings 94, clutch ring cage 86 and clutch ring 90 to move outboard due to the force developed between the cam follower and the surface of the fixed cam. Spring 98 is compressed by this movement and spring 96 biases clutch ring 90 outboard. When the clutch ring is moved sufficiently far, the outboard face 132 of the clutch ring spline is brought into contact with the inboard face 130 of spline 124 on axleshaft 28. The light engagement spring 96 maintains surfaces 130, 132 in contact but the splines of the clutch ring will not engage those of the axleshaft until the spline teeth become aligned with the recesses of the spline they are to engage.

When the cam follower has moved to the apex of the cam surface 104 on the fixed cam, further rotation of the differential casing brings the cam follower into contact with the cam surface 108 on the moving cam. The moving cam is keyed to the set of friction shoes 110 which produce and apply to the moving cam a drag force sufficient to hold or slow the moving cam enough so that the cam follower can move up the cam surface of the moving cam until the follower strikes the boss. After the cam follower contacts the boss, the cam follower and moving cam rotate as a unit provided the direction of rotation is such that the cam follower and boss maintain contact. However, when the directional sense of rotation changes, the cam follower disengages the boss and relative rotation between the moving cam and cam follower is possible.

Disengagement is effected when the operator moves the shift lever within the passenger compartment from the four-wheel drive position to the two-wheel drive position. This action causes the front driveshaft 22 to become driveably disconnected from the transmission output because the drive sprocket of the chain drive mechanism is disengaged from the transmission output and power is transmitted thereafter only to the rear set of wheels. When these conditions occur, the front axleshafts are not driven from the engine, but are rotated by the respective wheel assemblies as they rotate in contact with the ground. To disengage the clutch mechanism 64, the wheel must be rotated opposite the direction that produced engagement. The cam follower moves inboard on the surfaces of the moving cam and fixed cam, and the compressed engagement spring 98 applies a force directed inward on the clutch ring cage so that it follows the inboard motion of the cam follower. Flange 122 at the outboard end of the ring cage engages clutch ring 90 and moves its spline out of engagement with spline 124 on axleshaft 28. In this way the right-hand axleshaft 28 is driveablay disconnected from input shaft 62.

However, since only one automatic disconnect mechanism is employed, when two-wheel drive is selected and the vehicle is driven in the direction opposite to that which produced engagement, the left-hand front wheel drives the left front axleshaft 30, which rotates bevel pinions 50, 52 of the differential mechanism due to their engagement with side bevel gear 58. Side bevel gear 56 is rotated by pinions 50, 52 and input shaft 62 rotates. The process of disengagement requires that the heavy return spring 98 develops sufficient force when compressed so as to move the clutch ring inboard out of engagement with spline 124. As these splines are disengaging, the friction force developed on the mating spline teeth, while transmitting torque between the input shaft 62 and axleshaft 28 of the magnitude required to rotate the axle gears, driveshaft and transfer case, must be overcome by the force of spring 98. It is an advantage, therefore, to have the automatic clutch mechanism operating in an oil bath so that the friction force developed during disengagement of the mating splines is kept to a minimum.

Having thus described the preferred embodiment of our invention, what we claim and desire to secure by U.S. Letters Patents is:

1. A mechanism for transmitting power comprising:
   an input shaft selectively connectable to a power source;
   a differential mechanism including a casing connected to the input shaft and mounted for rotation about an axis, a stub shaft fixed to the casing, pinions rotatably mounted on the stub shaft, gears in meshing engagement with the pinions;
   a first output shaft connected to a gear of the differential mechanism defining a first clutch surface;
   a second output shaft coaxial with the first output shaft and defining a second clutch surface; and
   clutch means for driveably connecting and disconnecting the differential casing and the output shaft including a cam follower connected to the differential casing and mounted for rotation therewith, a cam having a cam surface on which the cam follower moves adapted to produce axial movement of the cam follower as the differential casing rotates, a cage mounted for axial displacement in response to axial movement of the cam follower having a third clutch surface adapted to engage the first and second clutch surfaces of the first and second output shafts.

2. The mechanism of claim 1 wherein the cage further comprises a clutch ring on which the third clutch surface is formed, the clutch ring being adapted for axial movement relative to the clutch and relative to the first and second clutch surfaces; and engagement spring means for resiliently urging the clutch ring toward the second clutch surface.

3. The mechanism of claim 1 wherein the cage further comprises a clutch ring continuously driveably engaged with the first clutch surface and having a third clutch surface formed thereon, the clutch ring having a face fronting a face formed on the second clutch surface, mounted on the first clutch surface for axial movement toward and away from the second clutch surface, and adapted to make abutting contact between the faces of the second and third clutch surfaces; and engagement spring means for resiliently urging the third clutch surface into engagement with the second clutch surface.

4. The mechanism of claim 2 further comprising a disengaging spring means for resiliently urging the cage ring away from the second clutch surface.

5. The mechanism of claim 1 wherein the cage further comprises a clutch ring continuously driveably engaged with the first clutch surface and having a third clutch surface formed thereon, adapted for axial movement relative to the cage and relative to the first and second clutch surfaces;

engagement spring means for resiliently urging the cage ring toward the second clutch surface; and disengagement spring means for resiliently urging the clutch ring away from the second clutch surface.

6. The mechanism of claim 1 further comprising a differential housing defining a space within which the differential mechanism and clutch means are located including means for sealing said housing against the flow of hydraulic fluid.

7. A system for selectively transmitting power between a power source and a first set of wheels comprising:

a driveshaft;

means for selectively connecting the power source and the driveshaft;

first and second axleshafts, each driveably connected to one of the wheels of the first set;

a first differential mechanism, the mechanism including a casing mounted for rotation and driveably connected to the driveshaft, a stub shaft mounted on the casing carrying bevel pinions, side bevel gears meshing with the bevel pinions, one bevel gear connected to the first axleshaft, a second bevel gear connected to an output shaft; and clutching means for driveably connecting the second axleshaft to the output shaft including a cam follower connected to the differential casing and mounted for rotation therewith, a cam surface on which the cam follower moves adapted to produce axial movement of the cam follower as the differential casing rotates, means for driveably connecting and disconnecting the second axleshaft and the output shaft as the position of the cam follower varies.

* * * * *